United States Patent [19]

Meckstroth et al.

[11] Patent Number: 4,987,985
[45] Date of Patent: Jan. 29, 1991

[54] AUTOMOTIVE FAN DRIVE TRAIN ASSEMBLY HAVING A HYDRAULIC COUPLER AND A VISCOUS CLUTCH

[75] Inventors: Richard J. Meckstroth; James R. Clarke, both of Northville, Mich.

[73] Assignee: Ford Motor Company, Dearborn, Mich.

[21] Appl. No.: 428,572

[22] Filed: Oct. 30, 1989

[51] Int. Cl.$^5$ ............................................. F16D 39/00
[52] U.S. Cl. .............................. 192/58 A; 123/41.11; 464/88; 464/102
[58] Field of Search ................ 192/58 R, 58 A, 58 B; 464/24, 88, 102; 123/41.11, 41.12

[56] References Cited

U.S. PATENT DOCUMENTS

| | | | |
|---|---|---|---|
| 2,297,619 | 9/1942 | Haberstump | 464/88 |
| 2,574,129 | 11/1951 | Spaleny | 60/54 |
| 2,824,434 | 2/1958 | Stern | 464/88 |
| 2,917,937 | 12/1959 | Dodge | 123/41.11 |
| 3,220,640 | 11/1965 | Kambs | 230/270 |
| 3,272,188 | 9/1966 | Sabat | 123/41.11 |
| 3,621,822 | 11/1971 | Oster | 123/41.11 |
| 4,066,047 | 1/1978 | Vidakovic et al. | 123/41.12 |
| 4,071,252 | 1/1978 | Gillespie | 274/39 R |
| 4,238,015 | 12/1980 | Schmida | 192/58 B |
| 4,451,202 | 5/1984 | Hauser | 123/41.11 |
| 4,493,293 | 1/1985 | Paul et al. | 192/58 A |
| 4,597,481 | 7/1986 | Müller et al. | 192/58 A |
| 4,658,671 | 4/1987 | Martin | 475/93 |

FOREIGN PATENT DOCUMENTS 1400060 3/1969 Fed. Rep. of Germany ... 123/41.11

Primary Examiner—Rodney H. Bonck
Assistant Examiner—Nicholas Whitelaw
Attorney, Agent, or Firm—Kevin J. Heinl; Jerome R. Drouillard; Keith L. Zerschling

[57] ABSTRACT

A drive train assembly (10) for an automotive fan (12) which includes a hydraulic coupler (22) that dynamically interconnects a fan blade shaft (24) to a driving shaft (18) within a range of radial offsets to permit reduction of clearance required between the fan blade (26) and a body mounted shroud (30). The hydraulic coupler (22) includes driving and driven turbines (48,50) that are drivingly interconnected by means of a fluid (64) operated upon by a plurality of vanes (56,58) located in cavities (52,54) formed in each of the turbines. An anti-friction bearing (28) journals the fan blade shaft (24) in the shroud (30). A universal joint (32) or elastomeric coupler, connects the driving shaft (18) to the fan blade shaft (24) dynamically in any one of a number of relative angular positions. A clutch (20) is included to limit speed of rotation of the fan blade (26) within operational limits.

20 Claims, 2 Drawing Sheets

AUTOMOTIVE FAN DRIVE TRAIN ASSEMBLY HAVING A HYDRAULIC COUPLER AND A VISCOUS CLUTCH

FIELD OF THE INVENTION

The present invention relates to an automotive engine fan drive train. More particularly, the present invention relates to an automotive engine fan drive train which includes radial and angular displacement compensating elements which allow a fan blade shaft to be positively mounted within a bearing secured to the body mounted fan shroud.

BACKGROUND OF THE INVENTION

Automotive engine fans function to cool an engine by forcing air through the automotive engine radiator. Automotive engine fans also force air through air conditioning condenser coils. Automotive engine fans are normally driven by the automotive engine through a shaft extending from the water pump which is connected by a belt to the engine crankshaft. Electrically driven automotive engine fans have been developed to replace engine driven fans to allow operation independently of the automotive engine. Electrically driven fans add cost and weight to an automobile and are generally disfavored by automotive engineers.

Automotive design considerations including cooling efficiency, weight reduction, vehicle air flow resistance and styling have resulted in making it desirable to reduce the overall size of automotive fan and radiator assemblies. Higher efficiency automotive fans permit the use of smaller fans without a corresponding reduction in air flow capacity. Current styling preferences are moving towards providing smaller openings for air flow into the fan inlet area.

Engine vibration during normal operation and engine roll caused by starting and stopping the engine must be allowed for in engineering an automotive fan and shroud. Generally about one inch clearance is provided between the tips of the fan and the shroud. The shroud is normally body mounted and is generally unaffected by engine vibration and engine roll. Prior art automotive fan blade drive trains have not been positively attached to body mounted shroud assemblies by antifriction bearings due to the need to accommodate engine vibration and roll.

Clearance between the fan tips and shroud dramatically reduce fan efficiency. This clearance also limits the maximum fan size permitted within space defined by the fan shroud. For example, if clearance between the fan tips and shroud is reduced from the normal one inch to one-half inch, then the fan diameter may be increased by one inch within the same fan shroud. Since air flow efficiency varies as a cube of the diameter of the fan blade, a larger fan diameter increases air flow substantially. For example, by replacing a 16 inch diameter fan with a 17 inch diameter fan results in about a 25% increase in air flow.

A long-standing objective in the development of automotive engine fans and shroud assemblies is the reduction of noise. A larger fan permits reduction in the speed of rotation of the fan for the same air flow levels. Reduction of the speed of rotation decreases the amount of noise caused by the automotive fan.

Normally, fan rotation must be limited to about 2,500 revolutions per minute. The speed of rotation of the water pump varies directly with the engine speed and on some vehicles may at times reach 9,000 revolutions per minute. Viscous clutches such as that disclosed in U.S. Pat. No. 4,238,015 disengage at high speeds and may include a temperature responsive element which disengages the automotive fan at low temperatures. When the fan is disengaged, the engine is allowed to heat up without significant cooling by the engine radiator.

A general application hydraulic shaft coupler is disclosed in U.S. Pat. No. 2,574,129 which accommodates angular shaft offsets and functions as a hydraulic universal joint. This hydraulic universal joint does not allow axially offset shafts to be coupled together in a driving relationship.

These and other problems relating to automotive fan drive assemblies are overcome by the present invention.

SUMMARY OF THE INVENTION

The present invention relates to a fan assembly for an automotive engine which is rotated by a shaft driven by the engine. The fan assembly includes a clutch having a first axis about which the clutch is rotated. The clutch is operatively connected to the engine for rotation. A fan blade is connected to a fan blade shaft which is rotated about a second axis. A body mounted shroud encloses the periphery of the fan blade and is connected to the fan blade shaft by a bearing assembly. The viscous clutch and fan blade shaft are operatively coupled to each other within a range of radial offsets of the first axis relative to the second axis.

According to another aspect of the present invention, a coupler for shafts having a disengaged condition in which a driven member is rotated at a low angular velocity and an engaged condition in which the driven member is rotated at a relatively high angular velocity is improved by the inclusion of a dynamically radially shiftable hydraulic coupling apparatus. The hydraulic coupling has a driving turbine and a driven turbine. The driving turbine is rotated about an axis X and the driven turbine is rotated about an axis Y. Axis X and axis Y are dynamically positionable in any one of a number of relative radial positions. For example, a radial offset of up to one inch between axis X and axis Y are anticipated to be possible according to the present invention if necessary.

One feature of the present invention relates to providing a fan assembly as previously described with joining means for rotatably connecting a shaft driven by the engine with the fan blade shaft dynamically in any one of a number of relative angular positions. The joining means may be an elastomeric coupler or a universal joint.

Another feature of the present invention relates to the provision of a fan assembly as previously described in which the coupling means interconnecting the clutch and fan blade comprises a driving turbine shell and a driven turbine shell. The turbine shells each define cavities and are secured together in a radially shiftable relationship. The driving and driven turbine shells have a plurality of driving vanes and driven vanes in the cavities which define a plurality of fluid retaining cells in each of the respective cavities. The driving and driven turbine shells are assembled together with the cavities opening to each other with driving and driven vanes extending from the respective shells toward each other and terminating in a closely spaced relationship to the other vanes. A hydraulic fluid substantially fills the cavities formed in the driving and driven shells to provide a hydraulic link between the driving turbine shell and the driven turbine shell.

The driving and driven turbine shells preferably include first and second radially outwardly extending flanges which are secured together by an annular clamping ring having a radially inwardly opening annular slot in which the first and second flanges are received. Sealing elements are retained between both the first and second flanges and the annular clamping ring to retain hydraulic fluid. The sealing elements are preferably O-rings which are retained in annular grooves formed on each one of the first and second flanges. The O-rings form dynamic face seals with the first and second inner planar surfaces of the annular clamping ring respectively.

The hydraulic coupler of the present invention permits the use of an anti-friction bearing for positively journaling the fan blade shaft in the body mounted shroud assembly. Positively journaling the fan blade shaft further reduces the clearance required between the fan blade and the shroud.

These and other objects and advantages of the present invention will be better understood with reference to the attached drawings and the following detailed description of the invention.

DETAILED DESCRIPTION OF THE PREFERRED EMBODIMENT

Figure 1:
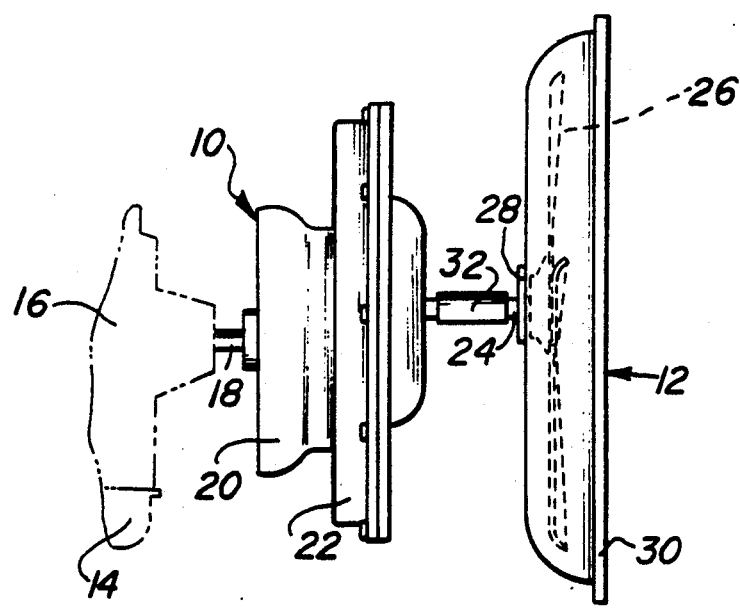
FIG. 1 is a side elevation view of an automotive fan and fan drive train assembly made in accordance with the present invention.

The drive train assembly of the present invention is indicated generally by reference numeral 10 in FIG. 1 of the drawings. The drive train 10 operates fan assembly 12 which is used to cool an automotive engine 14. The drive train 10 is driven by the water pump 16 which is in turn driven by the automotive engine 14. The water pump 16 includes a shaft 18 having a first axis "X". The water pump shaft 18 is connected serially through a clutch 20 and hydraulic coupler 22 to a fan blade shaft 24. The fan blade shaft 24 is rotated about a second axis "Y". A fan blade 26 is connected to and rotates with the fan blade shaft 24. The fan blade shaft 24 is mounted in an anti-friction bearing 28 secured to a shroud 30 enclosing the fan blade 26. The shroud 30 is a vehicle body mounted member.

A universal joint 32, preferably an elastomeric coupler, is incorporated as part of the fan blade shaft 24 in a preferred embodiment of the invention. The fan blade shaft 24 in this embodiment includes a stub shaft 33 which is connected to the hydraulic coupler 22. The stub shaft 33 may either be welded to the hydraulic coupler 22 or cast as part of the hydraulic coupler 22. The elastomeric coupler 32 provides a flexible link between the hydraulic coupler 22 and the fan blade 26 which compensates for angular displacement of the engine as may occur especially when starting or stopping the engine.

Figure 2:
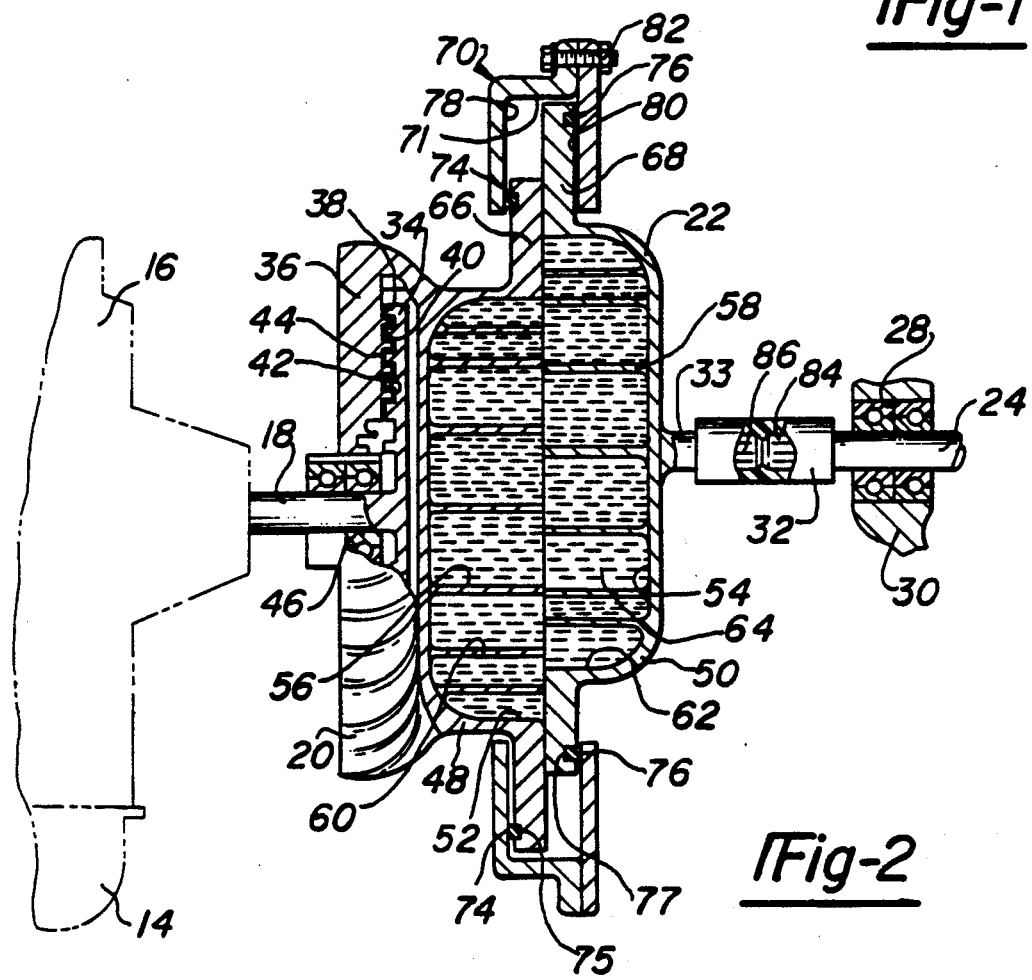
FIG. 2 is a cross-sectional view, partly in elevation, of the automotive fan drive train assembly of the present invention.

Referring now to FIG. 2, the construction of the clutch 20 will be described in greater detail. The clutch 20 is connected to the water pump shaft 18. A clutch plate 34 is connected to the shaft 18 and extends radially outwardly from the shaft. The clutch plate 34 is received within a clutch housing 36. A plurality of concentric annular lands 38 and grooves 40 are provided on one side of the clutch plate 34. A second plurality of lands 42 and grooves 44 are formed in the clutch housing 36. The lands 38 and grooves 40 are interdigitated with lands 42 and grooves 44. A bimetallic temperature responsive element (not shown) may also be incorporated in the clutch 20 as disclosed in U.S. Pat. No. 4,238,015, the disclosure of which is incorporated herein by reference. The clutch housing 36 is supported on the shaft 18 by anti-friction bearings 46 thereby allowing the housing to rotate with the shaft when the clutch is engaged or rotated relative to the shaft when the clutch is disengaged.

Figure 3:
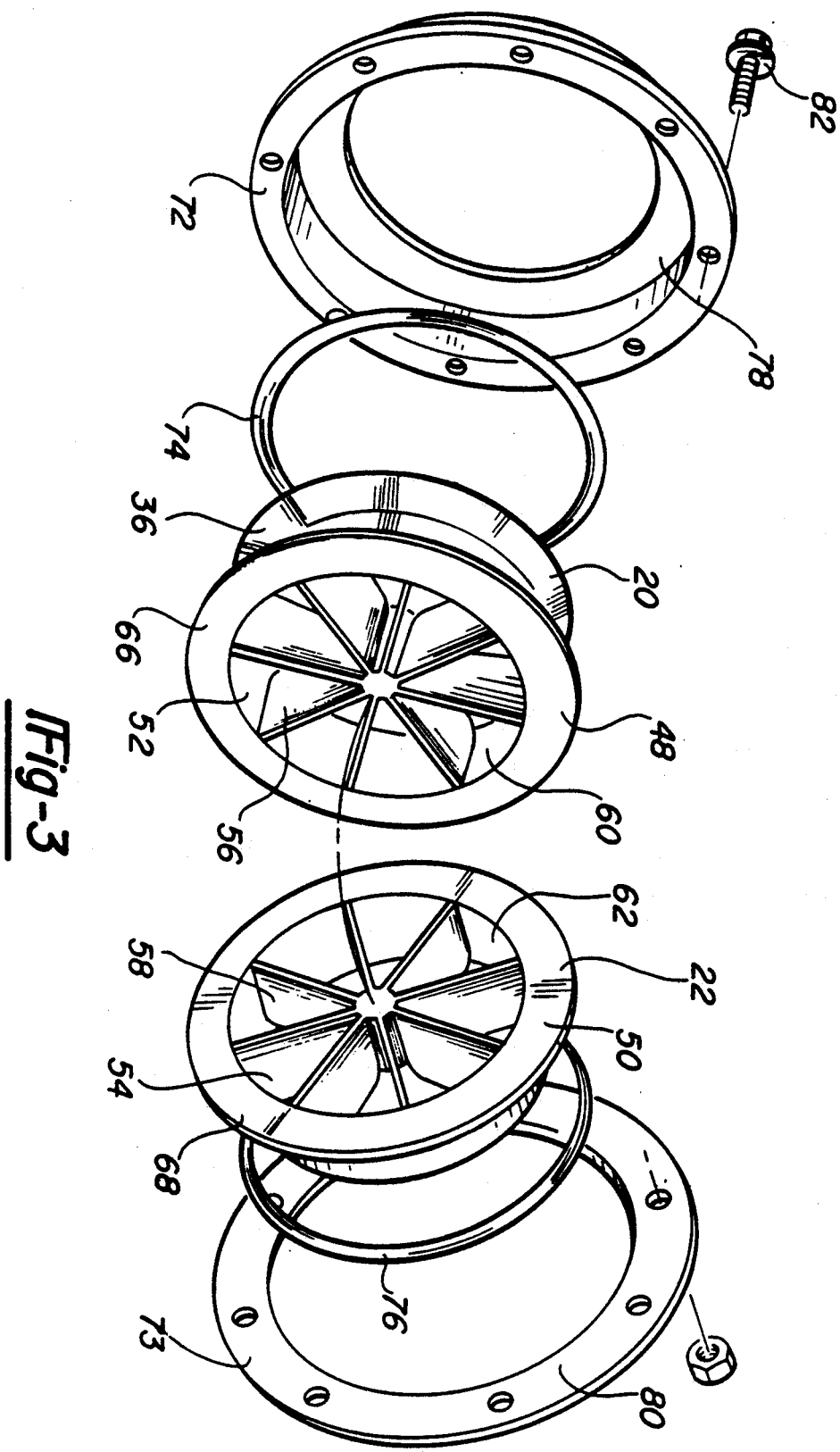
FIG. 3 is an exploded perspective view of the hydraulic coupler and viscous clutch which form a part of the present invention.

Referring now to FIGS. 2 and 3, the hydraulic coupler of the present invention will be described in greater detail. The hydraulic coupler includes a driving turbine shell 48 and a driven turbine shell 50. The driving turbine shell 48 is preferably formed as a combination part with the clutch housing 36. The driving turbine shell 48 and the clutch housing 36 may be formed by casting process as well known in the industry. First and second cavities 52 and 54 are formed within the driving turbine shell and the driven turbine shell 48 and 50, respectively. Driving vanes 56 are formed within the first cavity 52 and driven vanes 58 are formed in the second cavity 54 to define a plurality of cells 62. The viscous hydraulic fluid 64 is retained in the first and second cavities to provide a hydraulic interconnection between the driving turbine shell 48 and the driven turbine shell 50 which is acted upon by the driving and driven vanes 56 and 58. When the driving vanes 56 are rotated with the driving turbine shell 48 by the shaft 18, fluid shear forces exert rotational force on the driven vanes 58 which cause the driven turbine shell 50 to rotate.

A unique feature of the hydraulic coupler 22 of the present invention is that the hydraulic coupler dynamically adjusts for radial displacement of the shaft 18 relative to the shaft 24. First and second radially extending flanges 66 and 68 extend radially outwardly from the driving turbine shell 48 and the driven turbine shell 50, respectively. First and second radially extending flanges 66 and 68 are assembled together and are shiftable for coupling the clutch and the fan blade shaft within a range of axial offsets of the first axis X and the second axis Y, preferably to a maximum offset of one inch.

First and second radially extending flanges 66 and 68 are held in place by an annular clamping ring 70 having an annular inwardly opening slot 71. The annular clamping ring 70 is preferably formed in two pieces with one piece being a cup-shaped annulus 72 and the second piece being a planar ring 73. The cup-shaped annulus 72 and planar ring 73 together form the annular clamping ring 70 with the annular slot 71.

Sealing between the first and second radially extending flanges 66 and 68 and the annular slot is accomplished by means of two O-rings 74 and 76. O-rings 74 and 76 are located in annular slots 75 and 77 formed in the first and second radially extending flanges 66 and 68, respectively. The O-rings 74 and 76 sealingly engage first and second planar surfaces 78 and 80 on the inwardly facing radially extending walls of the annular slot 71.

Fasteners 82 fasten the cup-shaped annulus 72 and the planar ring 73 together thereby forming the annular clamping ring 70.

The elastomer coupler 32 interconnects the fan blade shaft 24 and stub shaft 33. The shafts 24 and 33 are received in a fluted bore 84 which extends through the elastomeric coupler 32. The shafts 24 and 32 have splines 86 which are adapted to be received within the fluted bore 84. The elastomeric coupler couples the fan blade shaft 24 to the stub shaft 33 for rotation and permits a limited degree of angular displacement of the shafts relative to each other.

The above-described preferred embodiment is intended to be illustrative of the invention which may be modified within the scope of the appended claims.

I claim:

1. A fan drive train assembly for an engine of an automobile comprising:
   a first shaft adapted to be driven by said engine;
   a clutch having a first axis "X" about which said clutch is rotated, said clutch being connected to the first shaft for rotation;
   a second shaft;
   a fan blade connected to said second shaft, said second shaft having a second axis "Y" offsettable from axial alignment with the first axis X of said clutch and about which said second shaft is rotated;
   a shroud enclosing the periphery of the fan blade and adapted for mounting to said automobile;
   a bearing assembly connecting said shroud and said second shaft; and
   means for coupling said clutch and said second shaft within a predetermined range of radial offsets of said first and second shafts.

2. The fan assembly of claim 1, wherein said means for coupling includes a stub shaft and joining means for rotatably connecting said stub shaft and said second shaft dynamically in relative angular positions with respect to each other.

3. The fan assembly of claim 2 wherein said joining means is an elastomeric coupler.

4. The fan assembly of claim 2 wherein said joining means is a universal joint.

5. The fan assembly of claim 1 wherein said means for coupling is a hydraulic coupler having a driving turbine shell and a driven turbine shell each defining cavities and being secured together in relatively radially offsettable relationship, said driving and driven turbine shells having a plurality of driving vanes and driven vanes in said cavities, respectively, said driving and driven vanes each defining a plurality of fluid retaining cells in corresponding cavities formed in the driving and driven turbine shells, said driving and driven turbine shells being assembled together with the cavities opening toward each other and with said driven and driving vanes extending from the respective shells toward each other and terminating in a closely spaced relationship to each other; and a fluid substantially filling the cavities formed in the driving and driven shells.

6. The fan assembly of claim 5 wherein said clutch and said driving turbine shell are defined by a one-piece housing.

7. In the fan assembly of claim 5, said driving and driven turbine shells having first and second radially outwardly extending flanges, respectively, an annular clamping ring having a radially inwardly opening annular slot in which said first and second flanges are received, and means for sealing between both of said first and second flanges and said annular clamping ring.

8. The fan assembly of claim 7 wherein said annular clamping ring has first and second planar surfaces, said first and second flanges have first and second annular grooves, respectively, and said sealing means further comprised first and second O-rings disposed in said first and second annular grooves, respectively; wherein said first and second O-rings form a dynamic face seal with said first and second planar surfaces of the annular clamping ring, respectively.

9. The fan assembly of claim 7 wherein the annular clamping ring is formed in two pieces which are fastened together.

10. The fan assembly of claim 1 wherein said bearing assembly is an anti-friction bearing located in a wall of said shroud.

11. A coupler for shafts having a disengaged condition in which a driven member is rotated at a relatively low angular velocity and an engaged condition in which the driven member is rotated at a relatively high angular velocity comprising:
    a hydraulic coupling apparatus having a driving turbine and a driven turbine, said driving turbine being rotated about an axis "X", said driven turbine being rotated about an axis "Y" which is radially shiftable with respect to the axis "X" about which said driving turbine is rotated, wherein said driving and driven turbines are dynamically radially positionable with respect to each other in a plurality of relative radially shifted positions.

12. The coupler of claim 11 wherein said coupler is a hydraulic coupler and said driving turbine and said driven turbine each defined cavities and are secured together in relatively radially shifting relationship, said driving and driven turbines having a plurality of driving vanes and driven vanes in said cavities, respectively, said driving and driven vanes each defining a plurality of fluid retaining cells is corresponding cavities formed in the driving and driven turbines, said driving and driven turbines being assembled together with the cavities opening to each other with said driven and driving vanes extending from the respective turbines to each other and terminating in a closely spaced relationship to the other of said vanes, and a fluid substantially filling the cavities formed in the driving and driven turbines.

13. The coupler of claim 11 including a viscous clutch housing adjoining said driving turbine, and formed as one-piece therewith.

14. In the coupler of claim 11, said driving and driven turbine shells having first and second radially outwardly extending flanges, respectively, an annular clamping ring having a radially inwardly opening annular slot in which said first and second flanges are received, and means for sealing between both of said first and second flanges and said annular clamping ring.

15. The coupler of claim 14 wherein said annular clamping ring has first and second planar surfaces, said first and second flanges have first and second annular grooves, respectively and said sealing means further comprise first and second O-rings disposed in said first and second annular grooves, respectively; wherein said first and second O-rings form a dynamic face seal with said first and second planar surfaces of the annular clamping ring, respectively.

16. The coupler of claim 14 wherein the annular clamping ring is formed in two pieces which are fastened together.

17. A hydraulic coupler for connecting a power source to a fan in close fitting clearance with a shroud which is relatively movable with respect to said power source, said coupler comprising:
- a first turbine shell having an input shaft rotatable about a first axis and adapted to be connected to said power source;
- a second turbine shell having an output shaft rotatable about a second axis and adapted to be connected to said fan;
- said turbine shells cooperating with each other to contain hydraulic fluid therebetween and having respective peripheral portions in shiftable, face-to-face relation to each other to permit radial offset of said input and output shafts with respect to each other in response to the relative movement of said shroud with respect to said power source, whereby the close fitting clearance of said fan with respect to said shroud is maintained to enhance fan efficiency.

18. The hydraulic coupler of claim 17 including a viscous clutch between said first turbine shell and said input shaft.

19. The hydraulic coupler of claim 17 including a fan bearing on said shroud for journaling said output shaft.

20. The hydraulic coupler of claim 17 including an outer case surrounding the peripheral portions of said turbine shells and in sealing relation thereto to enhance the cooperation of said turbine shells in the containment of said hydraulic fluid irrespective of the offset of said input and output shafts with respect to each other.

* * * * *